United States Patent [19]

O'Neil et al.

[11] Patent Number: 5,373,106

[45] Date of Patent: * Dec. 13, 1994

[54] QUICK-CONNECT FITTING FOR ELECTRICAL JUNCTION BOX

[75] Inventors: Daniel J. O'Neil, Moscow; Thomas J. Gretz, Clarks Summit, both of Pa.; Thomas S. Stark, Coral Springs, Fla.

[73] Assignee: Arlington Industries, Inc., Scranton, Pa.

[*] Notice: The portion of the term of this patent subsequent to Dec. 15, 2009 has been disclaimed.

[21] Appl. No.: 874,085

[22] Filed: Apr. 27, 1992

Related U.S. Application Data

[63] Continuation-in-part of Ser. No. 802,368, Nov. 4, 1991, Pat. No. 5,171,164.

[51] Int. Cl.5 ............................................. H01R 13/74
[52] U.S. Cl. ................................ 174/65 R; 285/162; 439/552
[58] Field of Search ............... 174/65 R, 65 G, 153 R, 174/153 G; 285/162

[56] References Cited

U.S. PATENT DOCUMENTS

| | | | |
|---|---|---|---|
| 1,483,218 | 2/1924 | Fahnestock . | |
| 3,183,297 | 5/1965 | Curtiss | 174/65 R |
| 3,858,151 | 12/1974 | Paskert | 285/162 X |
| 4,324,503 | 4/1982 | Sevrence | 285/162 X |
| 5,171,164 | 12/1992 | O'Neil et al. | 174/65 R X |

Primary Examiner—Leo P. Picard
Assistant Examiner—David Tone

[57] ABSTRACT

A spring steel adaptor that improves the ease of use and reduces the time involved in securing electrical connectors to electrical junction boxes. Several embodiments are disclosed which require the use of a zinc die-cast connector having a smoother central section to accommodate the spring steel adaptor. Some of the embodiments employ a spring steel adaptor that is designed to be used in conjunction with any of the standard size threaded electrical connectors that are presently in use in the electrical industry.

16 Claims, 12 Drawing Sheets

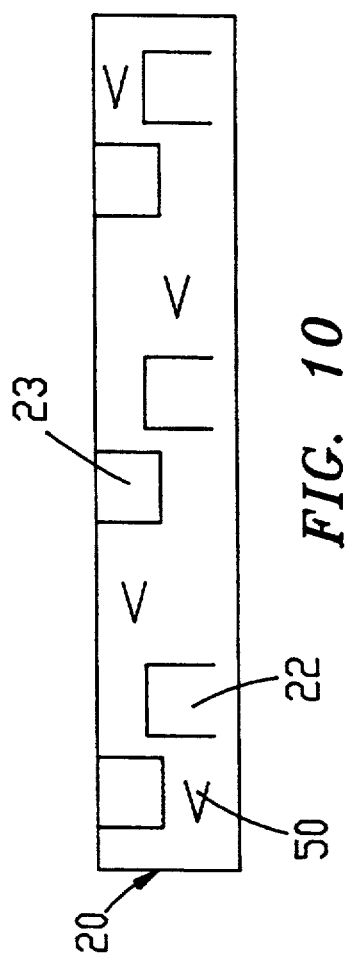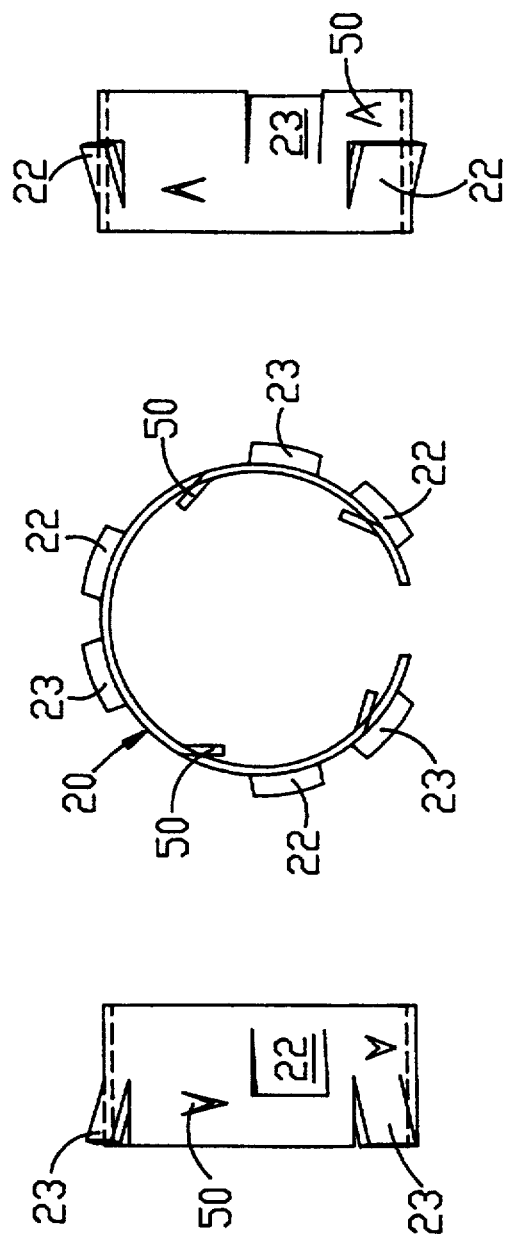
FIG. 10
FIG. 11
FIG. 12
FIG. 13

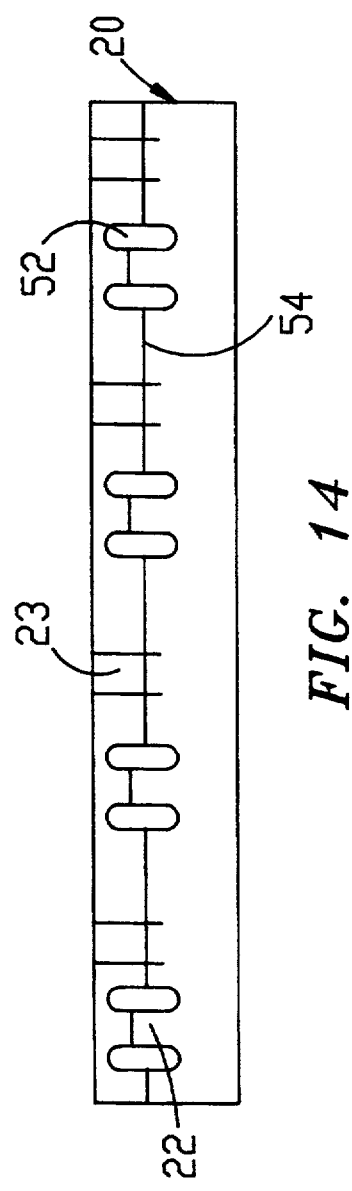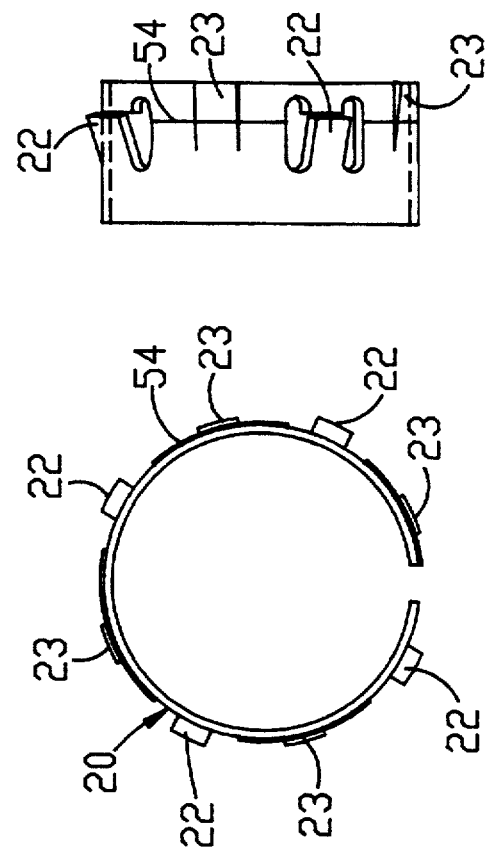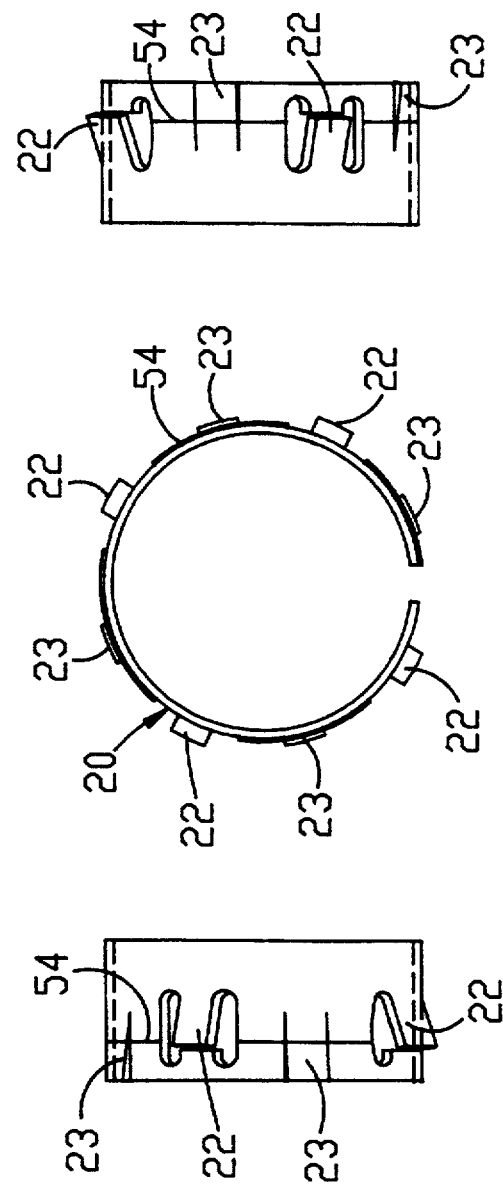

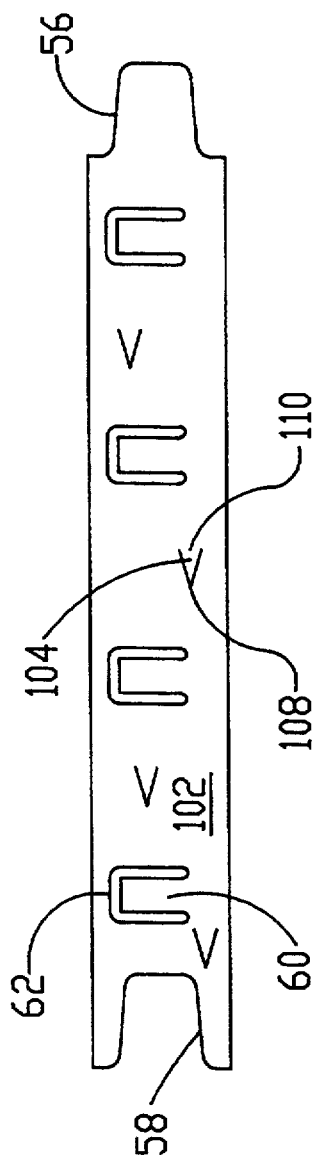
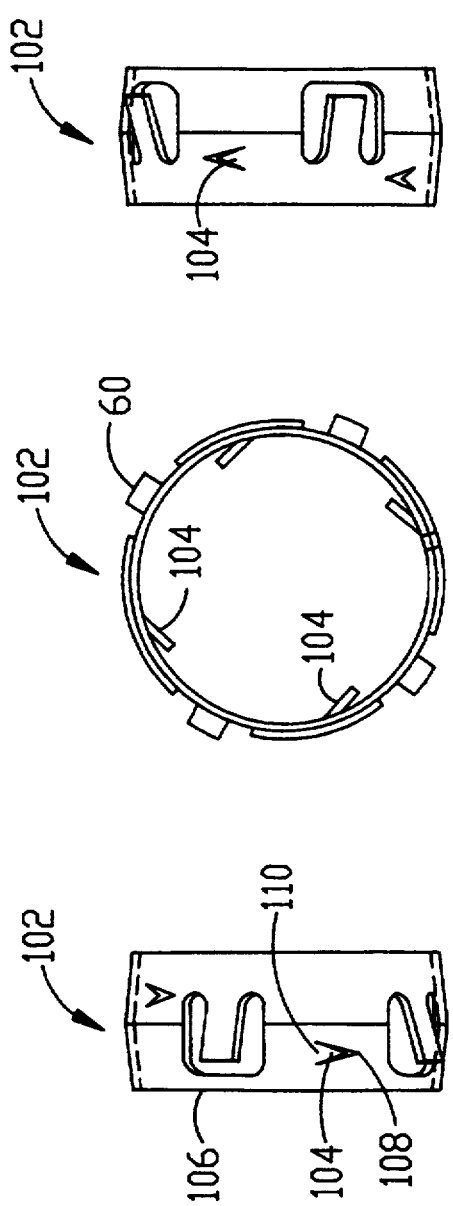
FIG. 32
FIG. 31
FIG. 30
FIG. 29

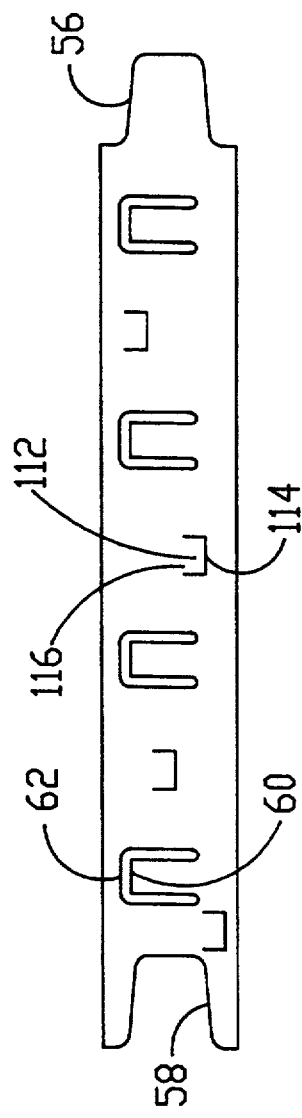
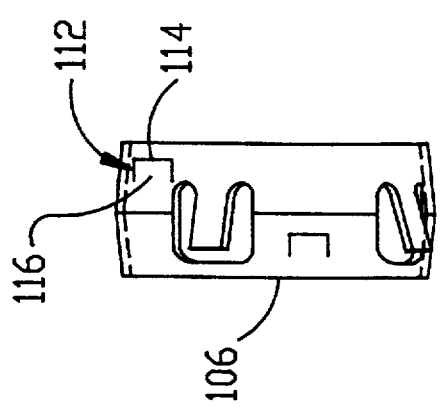
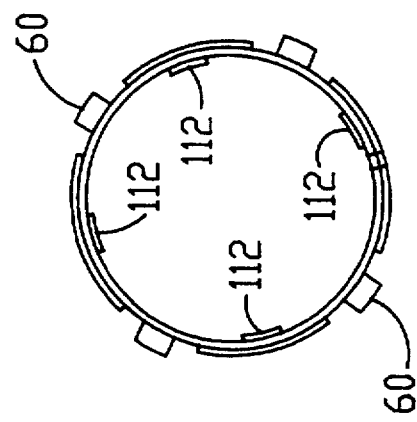
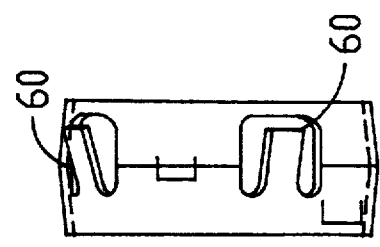
FIG. 36
FIG. 35
FIG. 34
FIG. 33

QUICK-CONNECT FITTING FOR ELECTRICAL JUNCTION BOX

This is a continuation-in-part of United States patent application filed on Nov. 4, 1991 as Ser. No. 07/802,368 now U.S. Pat. No. 5,171,164 by the same inventors and owned by the same Assignee and entitled QUICK-CONNECTING FITTING FOR ELECTRICAL JUNCTION BOX.

This invention relates to connectors for electrical junction boxes, specifically to an improved connector that can be easily attached to an anchored junction box by pushing with one hand.

BACKGROUND OF THE INVENTION

Heretofore, the most common form of attaching cable and electrical metal tubing (EMT) to electrical junction boxes is by the use of an interior-threaded lock nut which is screwed onto the exterior-threaded electrical fitting that extends into the junction box.

The disadvantage of the common threaded type of electrical connector is that it requires the use of both hands to secure it in place in the junction box. The flexible cable or EMT with the connector attached must be held in one hand while the threaded lock nut is held in the other hand, matched up to the threaded barrel of the connector, and then turned clockwise with respect to the connector until the lock nut is secured tightly to the connector. Matching the threaded lock nut to the connector can be very difficult, especially when the electrical junction box is in a location that is difficult to reach, such as a junction box for an overhead light fixture. In situations such as this, when it is difficult to see or to reach the junction box, it is very difficult to match up the connector and the lock nut and start the lock nut on the connector.

OBJECTS AND ADVANTAGES

Accordingly, several objects and advantages of this invention are:
(a) to make it easy to inset electrical connectors into electrical junction boxes, with the use of one hand instead of two;
(b) to reduce the time involved to connect the electrical connector to the junction box; and
(c) to provide good electrical continuity, or ground, between the electrical connector, the junction box and the electrical source leading to the box as an integral part of the design of the connector.

DRAWING FIGURES

FIG. 10 is a laid out view of a third embodiment of this invention showing a spring steel adaptor before the tangs are lanced and pressed out and before the adaptor is formed into a circle.

FIG. 11 is a side view of the same third embodiment shown in FIG. 10, after being formed into a circular shape.

FIG. 12 is a plan view of the same third embodiment shown in FIG. 11.

FIG. 13 is a side view of the third embodiment, with this view showing the spring steel adaptor of FIG. 10 rotated 180 degrees from the view shown in FIG. 11.

FIG. 14 is a laid out view of the fourth embodiment of this invention showing a spring steel adaptor before the tangs are lanced and pressed out and before the adaptor is formed into a circular shape.

FIG. 15 is a side view of the same embodiment shown in FIG. 14, after being formed into a circular shape.

FIG. 16 is a plan view of the same embodiment shown in FIG. 15.

FIG. 17 is a side view of the fourth embodiment, with this view showing the spring steel adaptor of FIG. 14 rotated 180 degrees from the view shown in FIG. 15.

FIG. 29 is a side view of the seventh embodiment of the spring steel adaptor especially designed to be placed on a threaded connector.

FIG. 30 is a plan view of the spring steel adaptor of FIG. 29.

FIG. 31 is a side view of the seventh embodiment of the spring steel adaptor rotated 180 degrees from the view shown in FIG. 29.

FIG. 32 is a laid out view of the seventh embodiment of the spring steel adaptor before the tangs are lanced and pressed out and before the adaptor is formed into a circular shape.

FIG. 33 is a side view of the eighth embodiment of the spring steel adaptor especially designed for threaded connectors.

FIG. 34 is a plan view of the spring steel adaptor of FIG. 33.

FIG. 35 is a side view of the eighth embodiment of the spring steel adaptor rotated 180 degrees from the view shown in FIG. 33.

FIG. 36 is a laid out view of the eighth embodiment of the spring steel adaptor before the tangs are lanced and pressed out and before the adaptor is formed into a circular shape.

Figure 1:
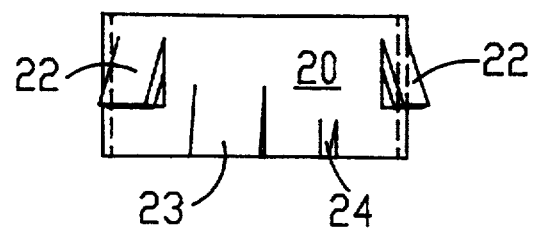
FIG. 1 shows a side view of the first embodiment of this invention, a spring steel adaptor. It includes a view of the outward-bent locking tang and the inward-bent tensioner tang.

REFERENCE NUMERALS IN DRAWINGS 20 spring steel adaptor
22 outward-bent locking tang
23 outward-bent tensioner tang
24 inward-bent tensioner tang
26 zinc die-cast connector
28 flange
30 raised shoulder
32 smooth central section or intermediate body of connector
34 electrical junction box
36 hole in electrical junction box to accommodate connector
38 wall of electrical junction box
40 outward-bent locking tang at narrowest depth from edge
42 outward-bent locking tang at second depth from edge
44 outward-bent locking tang at third depth from edge
46 outward-bent locking tang at fourth depth from edge
48 outward-bent locking tang at widest depth from edge
50 inward-bent tensioner/threading tang
52 oval-shaped slots
54 ridge
56 tongue
58 groove
60 outward-bent locking tangs
62 U-shaped slot
64 spring steel adaptor
66 smooth central section or intermediate body of connector
68 connector
70 adaptor middle portion
72 end diameter
74 outward-bent tensioner tang
76 raised shoulder
78 base or cantilevered line
80 overlapping end
82 overlapping end
84 outward-bent locking tangs
86 U-shaped slot
88 spring steel adaptor
90 electrical connector
92 adaptor middle portion
94 end diameter
96 raised shoulder
98 outward-bent tensioner
100 cantilever line
102 spring steel adaptor
104 locking points
106 base
108 points
110 line of cantilever of point
112 inwardly-bent thread following tang
114 leading edge
116 cantilevered line
118 split

DESCRIPTION—FIGS. 1 TO 9

A side view of a portion of the first embodiment is shown in FIG. 1. A typical spring steel adaptor 20 is shown, including the outward-bent locking tangs 22, an outward-bent tensioner tang 23, and an inward-bent tensioner tang 24. The spring steel adaptor 20 is typically 0.024 inches thick and formed from spring steel such as SAE 1095 tempered spring steel or its equivalent. The adaptor has a leading end, trailing end and intermediate body between the ends. The leading end is the upper end in FIG. 1.

Figure 2:
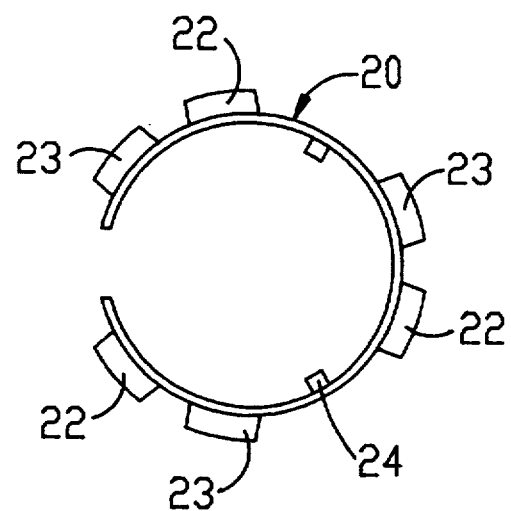
FIG. 2 is a plan view of the spring steel adaptor of FIG. 1, showing the location of the outward-bent locking tangs and inward-bent tensioner tangs.

A plan view of the spring steel adaptor 20 is shown in FIG. 2. The embodiment contains three outward-bent locking tangs 22, three outward-bent tensioner tangs 23 and two inward-bent tensioner tangs 24. The three outward-bent tensioner tangs 23 are formed flush with one edge of the spring steel adaptor 20 and are spaced typically 120 degrees apart around the outside circumference of the adaptor 20. The circular metal spring adaptor 20 has an opening that results from not forming a complete circle. When the outward-bent tangs or spring locking members are bent inward to permit the adaptor to be inserted in a hole, there is also a slight reduction in the diameter by the opening narrowing, therefore, there are two spring actions involved during insertion.

The three outward-bent locking tangs 22 are formed in the center section of the adaptor 20 as shown in FIG. 1. These three tangs are offset typically 40 degrees from the flush outward-bent tensioner tangs 23, and are typically spaced 120 degrees apart around the outside circumference of the adaptor.

Two inward-bent tensioner tangs 24 are shown on the inside circumference of the steel spring adaptor 20 shown in FIG. 2. These tangs are typically spaced 140 degrees apart.

Figure 3:
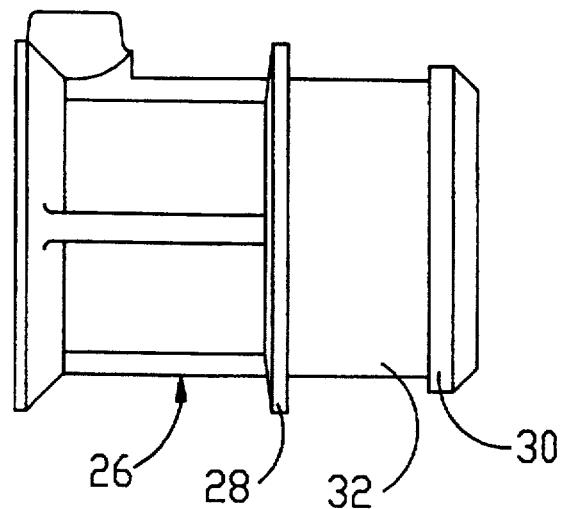
FIG. 3 is a side view of the electrical connector that the spring steel adaptor of FIG. 1 is used with, including the smooth central section without the spring steel adaptor.

FIG. 3 illustrates the zinc die-cast connector 26 including the smooth central section or intermediate body 32 that will accommodate the spring steel adaptor 20. The spring steel adaptor 20 will be held in place on the zinc die-cast connector 26 by the flange 28 and raised shoulder 30. The flange also serves to limit the insertion of the connector in a junction box hole. The connector shown is similar to a standard connector and can be of any suitable shape or design. There are approximately 30 different standard connectors.

Figure 4:
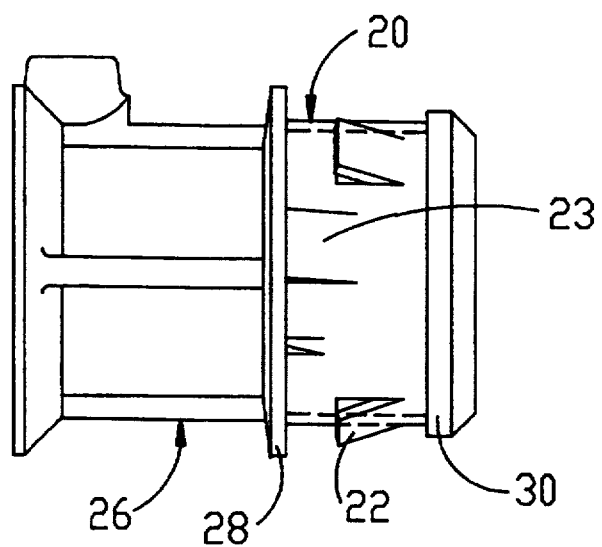
FIG. 4 shows a side view of the connector in FIG. 3 with the spring steel adaptor of FIG. 1 attached to the connector.

FIG. 4 illustrates a view of the zinc die-cast connector 26 with the spring steel adaptor 20 attached. The flange 28 is the trailing end and raised shoulder 30 with bevel is the leading end. They are shown holding the spring steel adaptor in place.

Figure 5:
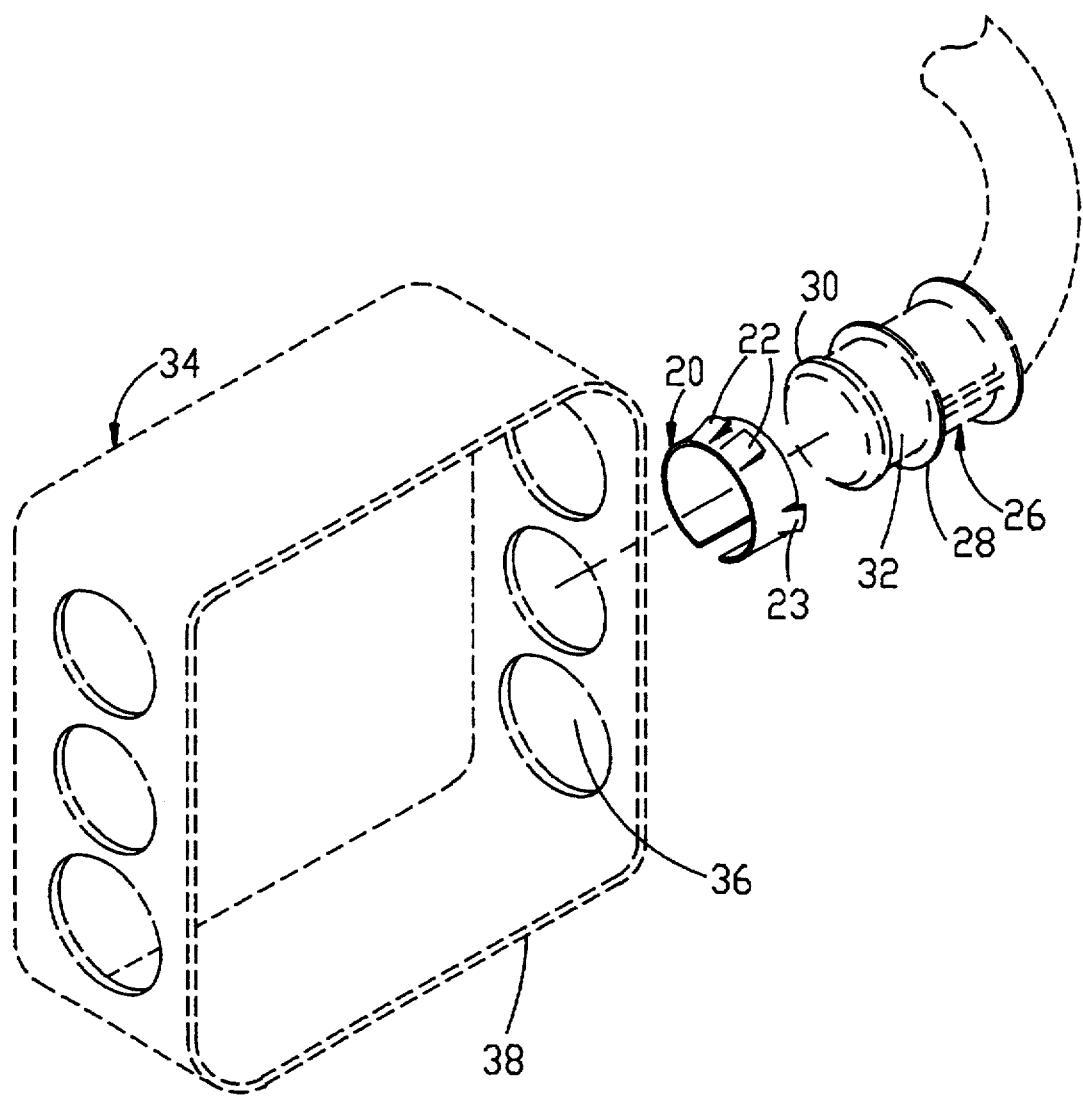
FIG. 5 is a broken away view of a typical electrical junction box, showing the connector of FIG. 3, including the smooth central section and the raised shoulder which will accommodate the spring steel adaptor. The spring steel adaptor of FIG. 1 is also depicted.

A broken away view showing a typical electrical junction box 34 with the zinc die-cast connector 26 is shown in FIG. 5. The smooth central section 32, the flange 28, and raised shoulder 30 of the connector 26 are depicted. A typical hole in the electrical junction box to accommodate the connector 36 is shown in the wall of the electrical junction box 38. The spring steel adaptor 20 is shown detached from the zinc die-cast connector 26 but centered around the axis on which it will be guided onto the connector. An outward-bent tensioner tang 23 and two outward-bent locking tangs 22 are annotated on this drawing.

Figure 6:
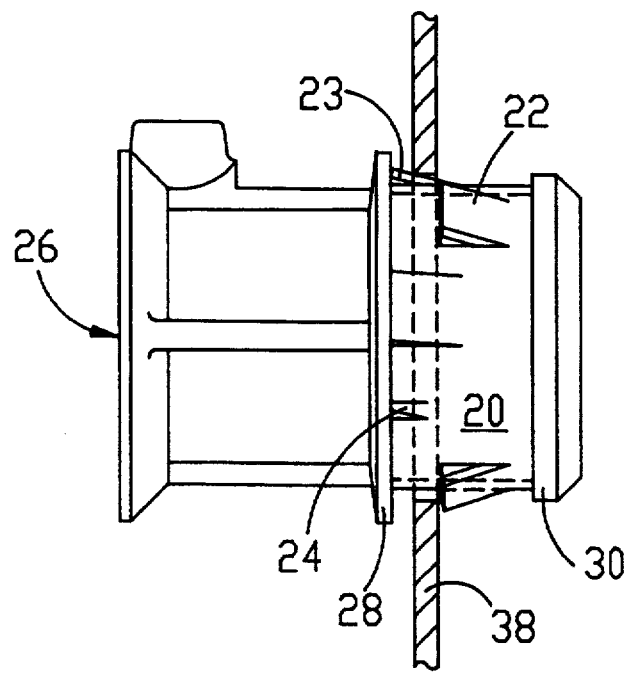
FIG. 6 shows the wall of a typical electrical junction box including the connector of FIG. 3 with the spring steel adaptor of FIG. 1 inserted. It depicts the outward-bent tangs depressed to tighten the connector and maintain electrical continuity.

FIG. 6 depicts the wall of the junction box 38 showing the zinc die-cast connector 26 with the spring steel adaptor 20 of the first embodiment inserted. The connector 26 is locked in place by the outward-bent locking tangs 22. The drawing depicts the outward-bent tensioner tangs 23 under tension. The flange 28, the raised shoulder 30, the outward-bent locking tangs 22, the outward-bent tensioner tangs 23, and an inward-bent tensioner tang 24 are all shown in relationship to the wall of the electrical junction box 38.

Figure 7:
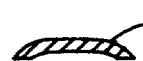
FIG. 7 is a detail drawing of a typical tang of the spring steel adaptor shown in FIG. 1.

A detail drawing of a tang is shown in FIG. 7. The outward-bent locking tangs 22 and the outward-bent tensioner tangs 23 of this first embodiment are typically bent out to a 0.936 inch diameter. Inward-bent tensioner tangs 24 are typically bent in to a 0.695 inch diameter.

Figure 8:
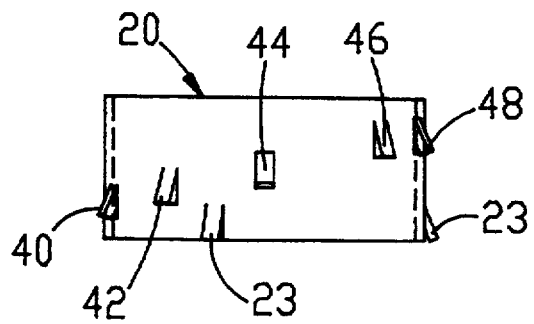
FIG. 8 shows a side view of a second embodiment, a spring steel adaptor with thirteen outward-bent tangs instead of 6, as in the preferred embodiment.

FIG. 8 is a side view of a second embodiment of this invention. It depicts five of the ten outward-bent locking tangs that are arranged at various locations on the circumference of the spring steel adaptor 20. From left to right in FIG. 8, there is depicted an outward-bent locking tang at the narrowest depth 40, an outward-bent locking tang at the second depth 42, an outward-bent locking tang at the third depth 44, an outward-bent locking tang at the fourth depth 46, and an outward-bent locking tang at the widest depth 48. As shown in the drawing, the outward-bent tensioner tangs 23 are formed flush with the side of the spring steel adaptor 20.

Figure 9:
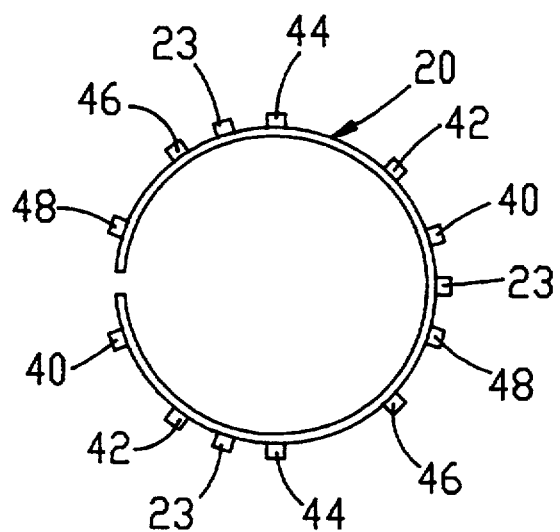
FIG. 9 is a plan view of the second embodiment shown in FIG. 8.
Figure 20:
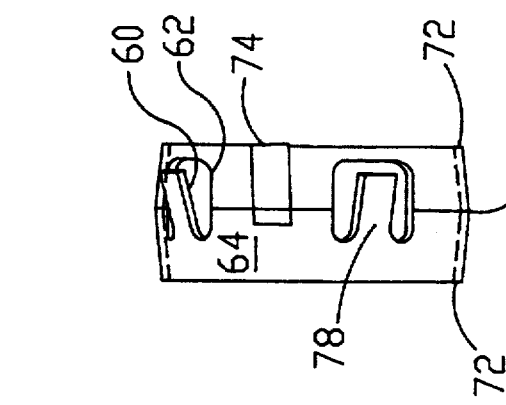
FIG. 20 is a side view of the fifth and preferred embodiment, this view showing the spring steel adaptor rotated 180 degrees from the view shown in FIG. 18.
Figure 19:
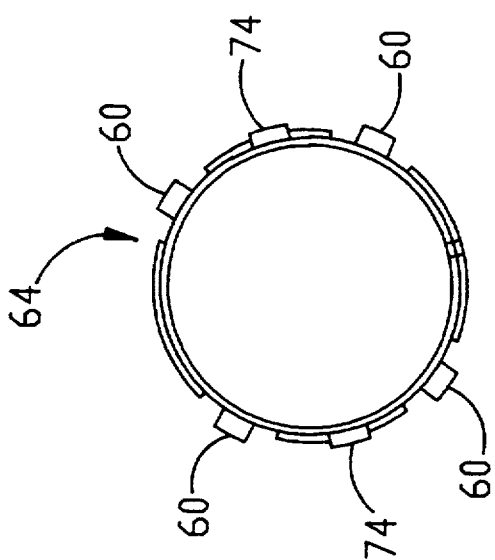
FIG. 19 is a plan view of the same preferred embodiment as shown in FIG. 18.
Figure 21:
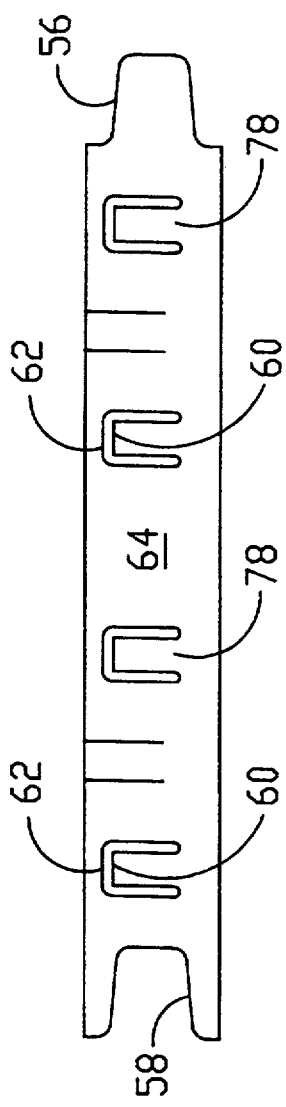
FIG. 21 is a laid out view of the fifth and preferred embodiment of the invention of FIGS. 18 through 20 showing a spring steel adaptor before the tangs are lanced and pressed out and before the adaptor is formed into a circular shape.

FIG. 9 depicts a plan view of the second embodiment showing the spring steel adaptor 20 with ten outward-bent locking tangs instead of 6 as in the first embodiment. Three outward-bent tensioner tangs 23 are located flush with one edge of the spring steel adaptor 20 and are spaced 120 degrees apart along its outer circumference. Two outward-bent locking tangs are the narrowest depth 40 are located approximately 180 degrees apart along the circumference of the adaptor. Likewise, two outward-bent locking tangs at the second depth 42, two outward-bent locking tangs at the third depth 44, two outward-bent locking tangs at the fourth depth 46, and two outward-bent locking tangs at the widest depth 48 are each respectively located approximately 180 degrees apart from their same numbered complement around the outer circumference of the spring steel adaptor 20.

FIG. 10 depicts a laid-out view of a third embodiment showing a spring steel adaptor 20 before the tangs are lanced and pressed out and before being formed into a circular shape. Depictions are made in the drawing to show where the outward-bent tensioner tangs 23, the outward-bent locking tangs 22 and the inward-bent tensioner/threading tangs 50 will be lanced out.

In FIG. 11, a side view of the spring steel adaptor 20 of FIG. 10 is shown, after being formed into a circle. Two outward-bent tensioner tangs 23, an outward-bent locking tang 22 and an inward-bent tensioner/threading tang 50 are depicted.

FIG. 12 gives a plan view of the third embodiment. The three outward-bent tensioner tangs 23 are located approximately 120 degrees apart on the outer circumference of the spring steel adaptor 20. The three outward-bent locking tangs 22 are also spaced typically 120 degrees apart on the outer circumference of the spring steel adaptor 20. The outward-bent locking tangs 22 are offset typically 40 degrees from the outward-bent tensioner tangs 23.

Four inward-bent tensioner/threading tangs 50 are depicted in FIG. 12 along the inner circumference of the spring steel adaptor 20.

Two inward-bent tensioner/threading tangs 50 are shown spaced at different distances from the edge of the spring steel adaptor 20 in FIG. 13.

FIG. 14 depicts a laid-out view of the fourth embodiment of this invention, a spring steel adaptor 20 containing oval-shaped slots 51. The slots are cut in the spring steel adaptor 20 to form the edges of the outward-bent locking tangs 22.

FIG. 14 also depicts a ridge 54 formed along the length of the laid-out spring steel adaptor 22. Four outward-bent tensioner tangs 23 are also annotated in the drawing.

The spring steel adaptor 20 of the fourth embodiment is shown formed into a circular shape in FIG. 15. This is a side view of the adaptor showing two outward-bent tensioner tangs 23 and two outward-bent locking tangs 22.

FIG. 16 is a plan view of the adaptor of the fourth embodiment. As shown in the plan view, four outward-bent locking tangs 22 are located typically 90 degrees apart around the outer circumference of the spring steel adaptor 20. Four outward-bent tensioner tangs 23, spaced typically 90 degrees apart, are also depicted. The outward-bent tensioner tangs 23 and the outward-bent locking tangs are offset typically 45 degrees from each other around the outer circumference of the spring steel adaptor 20.

FIG. 17 shows another side view of the fourth embodiment. Two outward-bent tensioner tangs 23 and two outward-bent locking tangs 22 are depicted in this view.

FIGS. 18 through 23 show a fifth and preferred embodiment of this invention.

Figure 23:
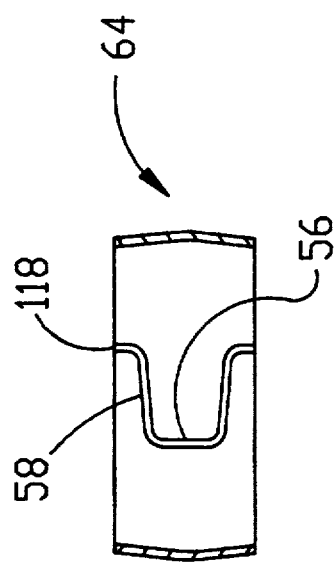
FIG. 23 is a fifth and preferred embodiment of the adaptor shown in cross section to show how the tongue and groove mate with one another.
Figure 22:
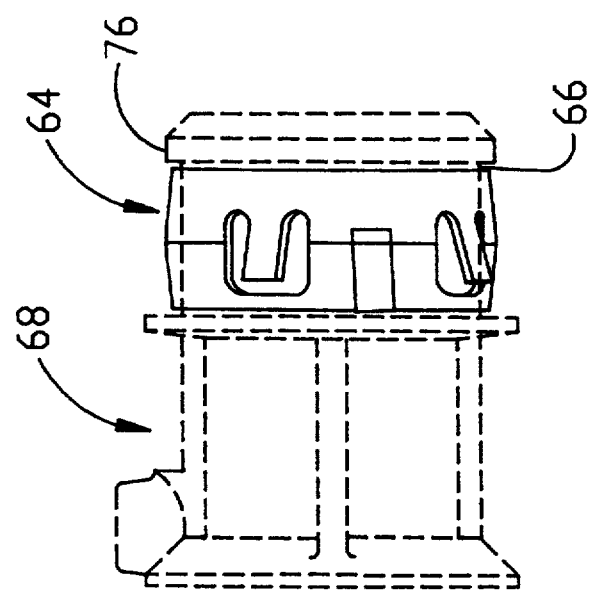
FIG. 22 is a fifth and preferred embodiment of the adaptor shown in place on a typical electrical connector fitting.

FIG. 22 shows the fifth and preferred embodiment of the adaptor mounted on a typical electrical connector. FIG. 23 is a cross section of the fifth and preferred embodiment of the adaptor showing how the tongue and groove interfit with one another prior to being assembled on the connector.

The preferred fifth embodiment is made from 0.02 inch thick 1095 spring steel or equivalent which is then heat treated and zinc plated to a thickness of 0.00015 inches. The overlapping ends are in the form of a tongue 56 and groove 58 which overlap each other as shown in FIG. 23. The overlap is in approximately the same plane with the ends separated by a split 118.

The four outward-bent locking tangs 60 are each surrounded by a U-shaped slot 62 so that the tangs are cantilevered at one end and are an integral part of the spring steel adaptor. When the adaptor is placed on its connector the four tangs resist a withdrawal of the electrical connector from an outlet box in excess of 300 pounds which is the resistance force required under the standards.

When the spring steel adaptor 64 is formed into a circle as shown in FIGS. 18 through 23, it is normally of a circumference smaller than the smooth central section or intermediate body 66 of connector 68. Thus when the adaptor 64 is stretched onto the smooth central section 66 it is sprung open approximately 1/16 inch to ⅛ inch.

Figure 18:
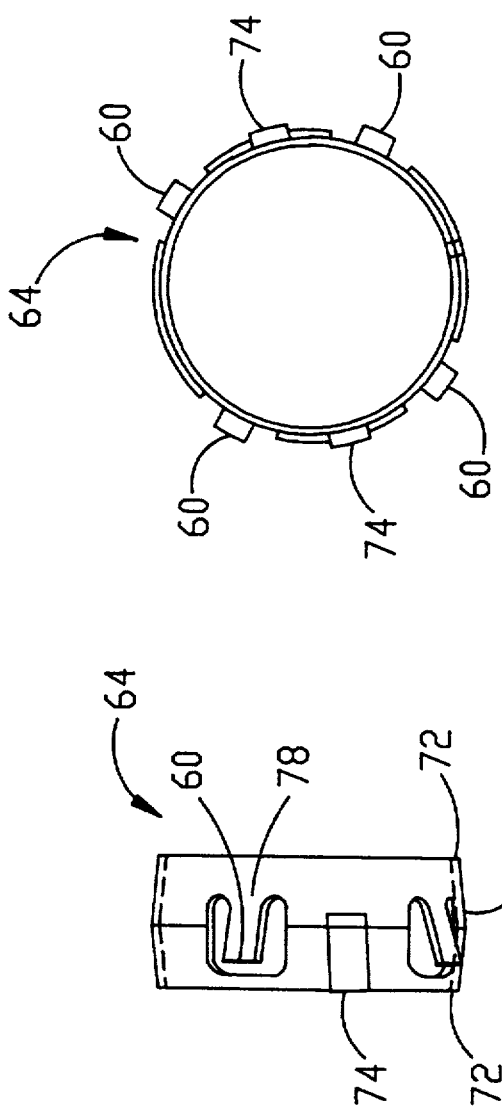
FIG. 18 is a side view of the fifth and preferred embodiment.

As is seen in FIGS. 18, 20, 22 and 23, the middle portion 70 of the spring steel adaptor 64 is bulged outward to a greater diameter than the end diameters 72. The end diameter 72 on the right in FIG. 18 is the leading end and the end diameter 72 on the left is the trailing end. Two outward-bent tensioner tangs 74 are provided at one side of the adaptor and are integral with and cantilevered from the body of the adaptor and serve to provide a tight fitting in the opening of the outlet box when the connector with adaptor is inserted therein. The tangs are designed so that their maximum external diameter in the freely sprung position is greater than the diameter of the opening in the electrical outlet box. Although as many of these tensioner tangs as desired can be used, it is found that two are sufficient in the embodiments shown when they are located on opposite sides from one another.

The U-shaped slot 62 has been found to be superior to the two oval shaped slots 52 shown in FIGS. 14 through 17. The bulge of the adaptor middle portion 70 serves to place on a larger diameter the line of cantilever of the outward-bent locking tangs 60 as well as the outward-bent tensioner tang 74 with the diameter at 70 being approximately the same diameter as the raised shoulder 30. This places the base or cantilevered line 78 of the outward-bent locking tang closer to the diameter of the hole in the electrical box through which the connector and adaptor are inserted. This permits a greater resistance to withdrawal by the locking tangs 60.

Figure 27:
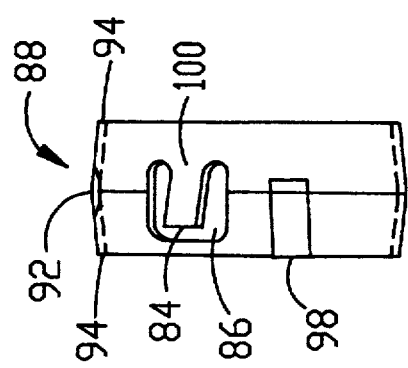
FIG. 27 is a laid out view of the sixth embodiment of the invention showing the spring steel adaptor of FIG. 24 before the tangs are lanced and pressed out and before the adaptor is formed into a circular shape.
Figure 28:
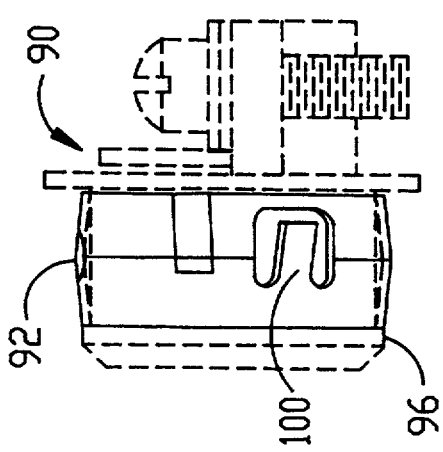
FIG. 28 is a side view of the sixth embodiment of the adaptor shown in place on an electrical connector.

The overlap between the tongue 56 and groove 58 are designed so that they will overlap the two free ends of the spring steel adaptor 64 when the adaptor is in an unexpanded free position with the two ends not quite meeting. However, when the spring steel adaptor 64 is placed on the smooth central section 66 of the connector 68, it expands its circumference but not sufficient to open up the adaptor ring to such an extent that the two ends are no longer overlapped. Other forms of overlap of the two ends may be utilized such as will be seen in FIGS. 27. The overlap, such as provided by the tongue and groove, is especially important to prevent the spring steel adapters from tangling with one another when handled in packing and during construction.

With reference to FIGS. 24 through 28 there is shown a sixth embodiment of the invention which is very similar to the fifth and preferred embodiment of 18 through 23 except it is designed to be shorter and for non-metallic sheathed cable connectors where the withdrawal force of the connector is only required to exceed 60 pounds pull. Here the overlap is by two similar overlapping ends 80 and 82 which overlap in approximately the same plane and are spaced apart slightly by a split (not shown) but similar to the split of FIG. 23. There are only two outward-bent locking tangs 84 of the spring steel adaptor 88. The two tangs are located opposite one another and are sufficient to withstand a withdrawal force of 60 pounds when utilized with electrical connector.

Figure 24:
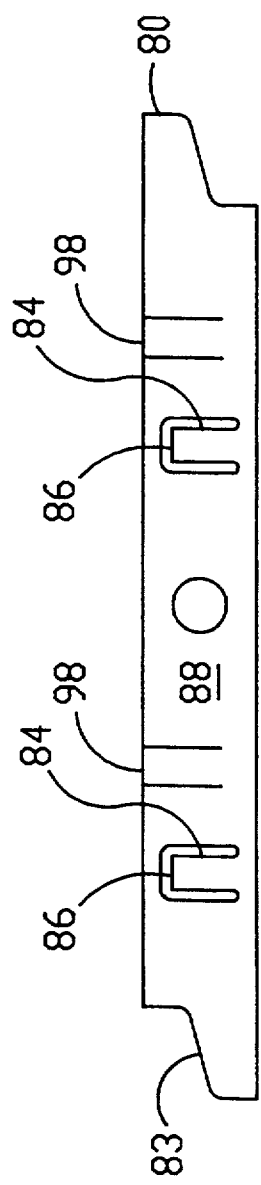
FIG. 24 is a view similar to FIG. 18 of a sixth embodiment especially designed for non-metallic sheathed cable connectors.
Figure 25:
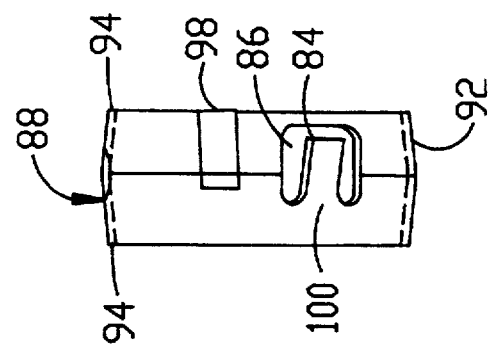
FIG. 25 is a plan view of the sixth embodiment shown in FIG. 24.
Figure 26:
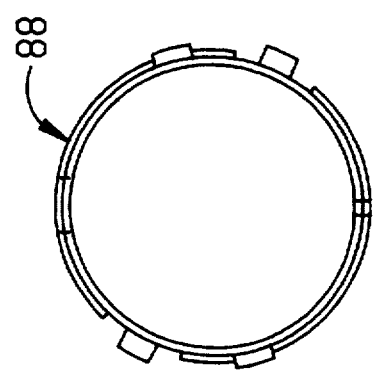
FIG. 26 is a side view of the sixth embodiment with a view showing the spring steel adaptor rotated 180 degrees from the view shown in FIG. 24.

The spring steel adaptor 88 has a bulged adaptor middle portion 92 and two end diameters 94. The end diameter 94 on the right in FIG. 24 is the leading end and the end diameter 94 on the left is the trailing end. The diameter of the middle portion 92 is approximately the same diameter as the raised shoulder 96 of the electrical connector 90. There are two outward-bent tensioner tangs 98 located on opposite sides of the spring steel adaptor 88. The base of the outward-bent locking tangs is integral with and cantilevered from the spring steel adaptor along the line 100. With reference to FIGS. 29 through 32 there is shown a seventh embodiment of the spring steel adaptor which is similar to the embodiment shown in FIGS. 18 through 21 with reference to the tongue and groove U-shaped slot and four outward-bent locking tangs for which similar members are used. However, this spring steel adaptor 102 is designed to be utilized with a standard electrical connector which is threaded and not one specially designed for this invention having a smooth central section and raised shoulder. The adaptor is supplied with four locking points 104 that run in a direction tangent to the diameter of the circular adaptor 102. With reference to FIG. 29, the base 106 of the adaptor has the points 108 of the locking points 104 spaced from the base and from each other so as to accommodate the spacing between the roots of the threads of the threaded electrical connector. Opposite the points 108 of each locking point is an integral line of attachment 110 where the locking points are cantilevered and integral with the body of the spring steel adaptor 102. The points 108 are inward-bent such that when the spring steel adaptor is threaded onto a threaded electrical connector the base 106 is first and causes the points to follow along as they are threaded onto the connector. However, if an effort is made to unscrew the adaptor the points 108 will dig into the roots of the threads and resist such unthreading action. Likewise, the side of the locking points resist a direct force in an axial direction on the spring steel adaptor to resist the adaptor being pulled off the threaded electrical connector.

With reference to the FIGS. 33 through 36 there is shown an eighth embodiment of the spring steel adaptor. This embodiment is similar to the embodiment 29 through 32 as it is utilizable with a standard threaded electrical connector. However, in this embodiment an inwardly-bent thread following tang 112 is provided rather than the locking points. The tang has a leading edge 114 and is cantilevered along a line 116 where it joins with and is an integral part of the spring steel adaptor from a threaded connector. The four thread following tangs 112 are staggered from the base 106 so that the leading edge falls into the root of the spacing of the threads on the electrical connector. The thread following tangs 112 do not prevent the unthreading or unscrewing of the spring steel adaptor but does offer a greater resistance to being pulled axially from the threaded connector.

OPERATION—FIGS. 3, 4, 6, 8, TO 35

All the embodiments of this invention are used to connect electrical metal tubing or cable to electrical junction boxes.

The first embodiment, shown in FIG. 4, is comprised of an electrical connector with a spring steel adaptor pressed onto its smooth central section, such as shown in FIG. 4. The spring steel adaptor 20 typically has an outer diameter of 0.845 inches in its relaxed state. A slight force is required to push the spring steel adaptor 20 over the raised shoulder 30 which is typically 0.848 inches in diameter. The raised shoulder 30 is beveled from 0.848 inches to 0.750 inches to allow the spring steel adaptor 20 to easily center on the connector and to slip over the shoulder when it is pressed onto it. The adaptor, typically 0.375 inches in width, fits easily into the 0.380 inch space between the raised shoulder 30 and the flange 28 of the zinc die-cast connector 26.

The electrical connector with adaptor is first secured to the EMT or cable by tightening a set screw. As shown in FIG. 5, the electrical connector 26 is then simply attached to the wall of the electrical junction box 34 by pushing the connector into the box until the flange 28 contacts the wall 38. The connector 26 enters the electrical junction box 34 easily as the raised shoulder 30 is beveled from a diameter of 0.848 inches to a diameter of 0.750 inches on the side that will first enter the electrical junction box 34. The diameter of the standard hole in the electrical junction box to accommodate the connector 36 is 0.875 inches. Therefore the zinc die-cast connector 26 at a 0.750 inch diameter on the beveled edge easily enters the opening which has a 0.875 inch diameter.

Some force is required to push the remainder of the electrical connector of the first embodiment into the junction box, as the outer circumference of the adaptor 20 including the outward-bent locking tangs 22 is typically 0.936 inches. The outward-bent locking tangs 22 must therefore be depressed to the diameter of the opening, 0.875 inches, before passing through. With the leverage provided by the cable or EMT connected to the opposite end of the connector, the connector will easily enter the junction box.

When the flange 28 contacts the wall of the electrical junction box 34 as shown in FIG. 6, the three outward-bent locking tangs 22 snap outward and prevent the connector from slipping out of the box. Typical wall thickness of a standard electrical junction box 34 is 0.070 inches. In this first embodiment, the distance from the outward-bent locking tangs 22 to the edge of the adaptor is typically 0.135 inches.

After the connector is pushed in completely, the three outward-bent tensioner tangs 23 exert force on the exterior wall of the electrical junction box 38, keeping the connector under tension and firmly in place against the wall. The diameter of the spring steel adaptor 20 inside the inward-bent tensioner tangs 24 is typically 0.695 inches, which is smaller than the 0.735 inch diameter of the smooth central section of the connector 32. This insures that good contact will be obtained between the spring steel adaptor 20 and the connector 26 when the connector is pushed into the junction box.

The outward-bent tensioner tangs 23 provide electrical continuity or ground between the spring steel adaptor 20 and the wall of the electrical junction box 38 by keeping the two in firm contact. In addition, the inward-bent tensioner tangs 24 provide electrical continuity between the zinc die-cast connector 26 and the spring steel adaptor 20 by keeping tension at two points of contact between the two.

The second embodiment of this invention provides the same function as the preferred embodiment but is designed to connect EMT or cable to electrical junction boxes of different wall thicknesses. As shown in FIG. 8, five outward-bent locking tangs 40, 42, 44, 46, and 48 are arranged at various distances from the edge of the spring steel adaptor 20. As shown in FIG. 9, another five outward-bent locking tangs 40, 42, 44, 46, and 48 are arranged at the same distances from the edge of the spring steel adaptor 20 with the relationship that the outward-bent locking tangs that are 180 degrees apart are at the same distance from the edge.

Thus, two outward-bent locking tangs at the narrowest depth 40 are located typically 180 degrees apart on the circumference of the adaptor of the second embodiment and are typically 0.101 inches from its edge. These two tangs would hold the connector in place for electrical junction boxes of widths less than typically 0.096 inches.

The two outward-bent locking tangs at the second depth 42 are located typically 0.132 inches from the edge of the adaptor. The two outward-bent locking tangs at the third depth 44 are located typically 0.166 inches from the edge of the adaptor. The two outward-bent locking tangs at the fourth depth 46 are located typically 0.196 inches from the edge of the adaptor. The two outward-bent locking tangs at the widest depth 48 are located typically 0.225 inches from the edge of the adaptor. As the wall thickness of electrical junction boxes increases, the higher numbered outward-bent locking tangs are progressively employed as needed to lock the connector in place.

In operation, if the adaptor shown in FIGS. 8 and 9 is inserted into an electrical junction box, the adaptor will slide into the box until the flange contacts the wall of the junction box. At that time, all the outward-bent locking tangs that have passed through the wall of the junction box will snap outward. The two outward-bent locking tangs that have snapped out and are closest to the wall of the junction box will prevent the connector from backing out of the junction box. All of the outward-bent locking tangs that have not passed through the wall of the junction box will become tensioner tangs and provide tension and electrical continuity between the spring steel adaptor 20 and the electrical junction box.

The third embodiment of this invention is shown in FIG. 10. This embodiment is a spring steel adaptor that is designed to be used with a number of existing threaded electrical connectors that are in common use in the electrical industry today. FIG. 10 depicts a laid-out view of the third embodiment showing a spring steel adaptor 20 before the tangs are lanced and pressed out and before being formed into a circular shape.

As shown in the drawing, the outward-bent tensioner tangs 23 and the outward-bent locking tangs 22 are similar to those employed in the first and second embodiments of this invention. The distinguishing difference with this embodiment is the use of inward-bent tensioner/threading tangs 50 that will be lanced and pressed inward to provide a means of threading this adaptor onto the properly sized threaded electrical connector.

After being formed into a circular shape, the inside diameter of the spring steel adaptor 20 of FIGS. 11, 12 and 13 is typically 0.782 inches. Both the outward-bent locking tangs 22 and the outward-bent tensioner tangs 23 are pressed outward to an outer diameter of 0.936 inches. The four inward-bent tensioner/threading tangs 50 are pressed inward to form a typical inner diameter for the spring steel adaptor 20 of 0.695 inches.

As shown in FIG. 10 in the laid-out view, the inward-bent tensioner/threading tangs are staggered in the distance from the edge to permit the tangs to follow the thread of the electrical connector that it will be threaded on. From right to left in FIG. 10, the inward-bent tensioner/threading tangs are located from the top edge of the spring steel adaptor 20 typically 0.060 inches, 0.103 inches, 0.220 inches and 0.263 inches. The tangs at 0.060 and 0.103 inches will start the adaptor on the threaded electrical connector when used. The tangs at 0.220 and 0.263 inches will follow onto the threads of the electrical connector as it is screwed further on and provide a positive means of threading and locking the adaptor onto the threaded end of the connector.

After threaded onto the connector the adaptor of the third embodiment will be screwed in until the adaptor is tightened onto the connector. The electrical connector with the adaptor attached can then be easily inserted into an electrical junction box having a typical 0.070 inch wall thickness.

The fourth embodiment is shown in FIGS. 14, 15, 16 and 17. This embodiment is designed to be pressed onto an electrical connector such as that shown in FIG. 3 and described in the operation section under embodiment 1.

This embodiment is similar to the first embodiment in function as it will be pressed onto the smooth central section of the connector shown in FIG. 3. It is an improvement over embodiment 1 in that less force is required to insert the fourth and preferred embodiment into an electrical junction box.

Less force is required to insert the fourth embodiment into a junction box as a result of the oval-shaped slots 52 depicted in FIG. 14. These oval-shaped slots 52 are punched out of the spring steel adaptor 20 prior to pressing out the outward-bent locking tangs 22. By removing the oval-shaped slots 52 of the spring steel adaptor 20, less force is then required to push the connector with adaptor into the electrical junction box.

An oval-shaped slot 52 forms each side of the outward-bent locking tangs 22. By having this portion of the spring steel adaptor removed, the outward-bent locking tangs 22 spring back and forth more freely, as there is no metal to metal contact when the tang is force inward.

A ridge 54 is pressed into the spring steel adaptor 20 along its length as shown in FIG. 14. The ridge 54 improves the springing action of the outward-bent tensioner tangs 23 and thereby improves the electrical continuity between the adaptor and the electrical junction box. The ridge 54 is typically pressed out to an outer diameter of 0.875 inches.

The spring steel adaptor 20 of FIG. 16 is typically 0.838 inches in outer diameter measured across the flat surface of the spring. Across its diameter from one outward-bent tensioner tang 23 to another, the spring typically measures 0.910 inches. The outer diameter of the spring measured across the outward-bent locking tangs 22 is typically 0.950 inches.

As the spring steel adaptor 20 of the fourth embodiment is inserted into a junction box, the outward-bent locking tangs 22, at a 0.950 inch diameter, spring inward as they are forced into the 0.875 inch typical opening in the junction box. The outward-bent locking tangs 22 then spring outward again to their at rest position after being pushed past the wall of the junction box. Springing action of the tangs occurs very early as the oval-shaped slots 52 eliminate metal to metal contact of the tangs with the spring body.

After the outward-bent locking tangs 22 are locked in place, the outward-bent tensioner tangs 23, at 0.910 inch diameter, exert tension between the spring steel adaptor 20 and the inner circumference of the opening in the electrical junction box. The ridge, at 0.875 inch outer diameter, also exerts force on the inner circumference of the opening in the electrical junction box and improves the electrical continuity between the adaptor and the junction box.

With reference to the preferred and fifth embodiment of FIGS. 18 through 23, the U-shaped slot 62 is of sufficient width to permit the outward-bent locking tang 60 to freely move within the slot. They cantilever about their base or cantilevered line 78. When the spring steel adaptor 64 is in its unstretched position, its diameter at the end 94 is 0.836 inches and at the middle portion 70 0.875 inches and the outward-bent locking tang 60 extend to an imaginary circle 0.950 inches in diameter. The outward-bent tensioner tangs 74 extend to an imaginary circle 0.910 inches in diameter.

With reference to FIGS. 24 through 28 which show the sixth embodiment of the spring steel diameter, the height of the adaptor 88 is somewhat shorter than that shown in the fifth preferred embodiment as it is 0.312 inches tall as opposed to the preferred embodiment of FIGS. 18 through 23 which is 0.380 inches tall.

The diameters are the same with reference to the seventh embodiment of FIGS. 29 through 32 and the eighth embodiment of FIGS. 33 through 36. The height and diameters are the same as the height and diameters of the preferred embodiment of FIGS. 18 through 23. However, in the case of the seventh embodiment in FIGS. 28 through 32 the inward-bent locking points 104 extend to an imaginary circle of slightly less than 0.760 inches in diameter. With reference to the eighth embodiment of FIGS. 33 through 36, the inwardly-bent thread following tangs 112 extend to an imaginary circle whose diameter is approximately 0.760 inches in diameter.

Both the seventh and eighth embodiments are designed to be utilized with normally threaded electrical connectors and permit such connectors to use some of the important features of the spring steel adapters without the need for a specially molded connector.

Although the invention has been described with the use of 1095 spring steel, or equivalent, which has been heat treated and zinc plated, metals other than steel could be utilized so long as the metal had similar spring and strength characteristics. However, any metals other than steel would probably be more expensive leaving spring steel as a preferred material.

SUMMARY, RAMIFICATIONS AND SCOPE

Accordingly, the quick connect fitting of this invention makes it easier to connect cable or EMT to electrical junction boxes. By using this invention, the amount of time required to connect cable or EMT to electrical junction boxes is reduced. Furthermore, the invention provides good electrical continuity or ground between the electrical connector, the junction box, and the source leading to the box as an integral part of the design of the connector.

Although the description above contains many specificities, these should not be construed as limiting the scope of the invention but as merely providing illustrations of some of the preferred embodiments of this invention. For example, the spring steel adaptor can have more tangs and the tangs can be of different dimensions.

Thus the scope of the invention should be determined by the appended claims and their legal equivalents, rather than by the examples given.

What is claimed is:

1. A quick connect fitting for an electrical junction box comprising:
    a hollow electrical connector through which an electrical conductor may be inserted having a leading end thereof for insertion in a hole in an electrical junction box;
    a circular spring metal adaptor surrounding said leading end of said electrical connector which has a middle portion and two ends with the diameter of said middle portion being greater than the diameter of said ends;
    at least two spring locking members integral with and cantilevered at one end from said metal adaptor that spring inward to a retracted position to permit said adaptor and locking member to be inserted in a hole in an electrical junction box and spring outward to lock said electrical connector from being withdrawn through the hole;
    U-shaped slots surrounding each of said spring locking members; and
    an arrangement on said connector for limiting the distance said connector can be inserted into the hole in the junction box.

2. The quick connect fitting of claim 1 which further includes:
    at least two outwardly sprung members carried by said metal adaptor near said trailing end of said adaptor which engage the side walls of the hole in the junction box into which said adaptor is inserted.

3. The quick connect fitting of claim 2 wherein:
    said circular spring metal adaptor is less than a complete circle that is of a relaxed diameter less than the hole into which it is to be inserted with said spring locking member extending beyond the diameter of the hole into which they are to be inserted.

4. The quick connect fitting of claim 1 wherein said adaptor is a split ring with the two ends of the ring shaped to overlap with one another.

5. The quick connect fitting of claim 4 wherein said connector has a flange and shoulder with smooth intermediate portion therebetween with said adaptor carried on said intermediate portion and held in position by said flange and shoulder.

6. The quick connect fitting of claim 1 wherein said connector has a flange and shoulder with smooth intermediate portion therebetween with said adaptor carried on said intermediate portion and held in position by said flange and shoulder.

7. The quick connect fitting of claim 1 which further includes:
    a series of inward-bent tensioner/threading tangs lanced from said circular spring adaptor that are staggered to coincide with threads on a standard electrical connector to permit the threading thereon of said adaptor.

8. The quick connect fitting of claim 7 wherein said tensioner/threading tangs are in the shape of triangles that dig in to resist the unthreading thereof.

9. The quick connect fitting of claim 7 wherein said tensioner/threading tangs are rectangular shaped having a cantilevered end extending in an axial direction.

10. A split circular spring metal adaptor for utilization with a hollow electrical connector for permitting a quick connect fitting of said connector in an electrical junction box comprising;
    a split circular spring metal adaptor having a diameter smaller than a hole in an electrical junction box into which it is to be inserted and which as a middle portion and two ends with the diameter of said middle portion being greater than the diameter of said ends;
    at least two spring locking members integral with and cantilevered at one end from said metal adaptor that spring inward to a retracted position to permit said adaptor box and spring outward to lock said electrical connector from being withdrawn through the hole; and
    U-shaped slots surrounding each of said spring locking members.

11. The split circular spring metal adaptor of claim 10 which includes a series of inward tensioner/threading tangs lanced from said adaptor that are staggered to coincide with threads on a standard electric connector to permit the threading thereon of said adaptor.

12. The split circular spring metal adaptor of claim 11 wherein said tensioner/threading tangs are in the shape of triangles that dig in to resist the unthreading thereof.

13. The split circular spring metal adaptor of claim 11 wherein said tensioner/threading tangs are rectangular shaped having a cantilevered end extending in an axial direction.

14. The split circular spring metal adaptor of claim 10 wherein the two ends of said split ring are shaped to overlap with one another.

15. A method for quickly connecting fittings to electrical junction boxes comprising:
    providing an electrical junction box with a hole;
    providing an electrical connector having a leading end for insertion in said hole;
    providing a circular spring metal adaptor surrounding said leading end of said electrical connector with said spring metal adaptor having a split that has two ends that are shaped to overlap with one another and further providing said adaptor with a middle portion and leading and trailing ends with said middle portion having a greater diameter than its leading and trailing ends;
    providing at least two spring locking members on said spring metal adaptor that have a relaxed outer dimension greater than the diameter of said hole with said locking member having U-shaped slots surrounding each of said locking members; and
    inserting said spring metal adaptor and electrical connector into said hole until said spring locking members have gone entirely through said hole and spring back to a locking position to prevent said adaptor and electrical connector from being withdrawn.

16. The method of claim 15 which further includes the steps of:
    providing a threaded section on said electrical connector leading end;
    providing inward bent tensioner/threading tangs lanced from said adaptor that are staggered to coincide with said threads; and
    threading said adaptor onto leading edge of said connector.

* * * * *